(12) United States Patent
Bertrand et al.

(10) Patent No.: US 11,772,591 B2
(45) Date of Patent: Oct. 3, 2023

(54) DEVICE FOR REMOVABLY MOUNTING AN AIRBAG MODULE ON A STEERING WHEEL

(71) Applicant: Autoliv Development AB, Vargarda (SE)

(72) Inventors: Olivier Bertrand, Courcome (FR); Remi Baillivet, Dampierre-en-Bray (FR); Hugues Doursoux, France Latille (FR); Thierry Jacqmarcq, Cuigy en Bray (FR)

(73) Assignee: Autoliv Development AB, Vårgårda (SE)

( * ) Notice: Subject to any disclaimer, the term of this patent is extended or adjusted under 35 U.S.C. 154(b) by 0 days.

(21) Appl. No.: 17/597,291

(22) PCT Filed: Jun. 29, 2020

(86) PCT No.: PCT/EP2020/068232
§ 371 (c)(1),
(2) Date: Dec. 30, 2021

(87) PCT Pub. No.: WO2021/001307
PCT Pub. Date: Jan. 7, 2021

(65) Prior Publication Data
US 2022/0314919 A1 Oct. 6, 2022

(30) Foreign Application Priority Data
Jul. 4, 2019 (FR) ...................... 1907437

(51) Int. Cl.
*B60R 21/203* (2006.01)

(52) U.S. Cl.
CPC ................. *B60R 21/2035* (2013.01)

(58) Field of Classification Search
CPC .................................... B60R 21/2035
See application file for complete search history.

(56) References Cited

U.S. PATENT DOCUMENTS 7,059,631 B2 * 6/2006 Schorle ............... B60R 21/2037
280/728.2
7,185,915 B2 * 3/2007 Fujita .................. B60R 21/2037
280/731

(Continued)

FOREIGN PATENT DOCUMENTS

DE 20017527 U1 * 2/2001 ............ B60Q 5/003
DE 102006047817 A1 5/2007

(Continued)

*Primary Examiner* — Nicole T Verley
(74) *Attorney, Agent, or Firm* — Matthew D. Thayne; Thayne and Davis LLC

(57) ABSTRACT

The invention relates to a device for removably mounting an airbag module on a steering wheel having a retaining portion of a resilient ring for forming elements for holding hooks on the other of the airbag module or the steering wheel in zones of interaction with the hooks, a mounting portion of the resilient ring forming a mounting rotation axis to ensure the rotation of the resilient ring, the resilient ring further including a locking portion, wherein the other of the airbag module or the steering wheel includes a first stop which is arranged to block the movement of the locking portion of the resilient ring in a first direction perpendicular to the mounting rotation axis (Y).

10 Claims, 6 Drawing Sheets

(56) References Cited

U.S. PATENT DOCUMENTS

| | | | | |
|---|---|---|---|---|
| 7,533,897 B1* | 5/2009 | Xu | ...................... | B60Q 5/003 |
| | | | | 280/728.2 |
| 9,914,420 B2* | 3/2018 | Raikar | ................ | B60R 21/2035 |
| 11,383,665 B2* | 7/2022 | Poojar | ................ | B60R 21/2035 |
| 2004/0169358 A1* | 9/2004 | Fujita | ................ | B60R 21/2037 |
| | | | | 280/731 |
| 2004/0217580 A1* | 11/2004 | Schorle | ............... | B60R 21/2037 |
| | | | | 280/728.2 |
| 2006/0208470 A1* | 9/2006 | Tsujimoto | ........... | B60R 21/2037 |
| | | | | 280/728.2 |
| 2007/0210562 A1 | 9/2007 | Vigeant et al. | | |
| 2012/0080868 A1* | 4/2012 | Banno | ................ | B60R 21/2037 |
| | | | | 280/728.2 |
| 2021/0170979 A1* | 6/2021 | Poojar | ................ | B60R 21/2035 |

FOREIGN PATENT DOCUMENTS

| | | | | | |
|---|---|---|---|---|---|
| EP | 0790153 | A1 | | 8/1997 | |
| EP | 1103430 | A1 | * | 5/2001 | ......... B60R 21/2035 |
| EP | 1705075 | A1 | * | 9/2006 | ......... B60R 21/2035 |
| EP | 1705075 | A1 | | 9/2006 | |
| EP | 1834845 | A2 | * | 9/2007 | ......... B60R 21/2035 |
| FR | 2780688 | A3 | * | 1/2000 | ......... B60R 21/2035 |
| GB | 2432342 | A | | 5/2007 | |
| JP | 2010254145 | A | | 11/2010 | |
| JP | 2012071803 | A | * | 4/2012 | ......... B60R 21/2037 |
| WO | WO-2022091768 | A1 | * | 5/2022 | |

* cited by examiner

DEVICE FOR REMOVABLY MOUNTING AN AIRBAG MODULE ON A STEERING WHEEL

The present invention relates generally to a device for removably mounting an airbag module on a steering wheel.

EP1705075 describes a steering wheel arrangement for motor vehicles comprising a steering wheel and an airbag module which can be removably connected to the steering wheel, wherein, for the simple mounting and dismounting of the airbag module, a quick-locking mechanism is provided which comprises at least one locking element extending parallel to the axis of rotation of the steering wheel and a spring (17) which engages behind the locking element in a locked manner in the installed position of the airbag module. According to this document, the spring is U-shaped and is mounted on the steering wheel via translation and then rotation. However, the spring is only retained in one direction, which can lead to disengagement when it is subjected to a high degree of stress (deployment or removal). On the other hand, this system requires a lot of space on its own or requires space for the movements necessary to attach the springs to the steering wheel. Furthermore, the springs are not easy to fit and it may take several tries to position them correctly.

One purpose of the present invention is to address the drawbacks of the above-mentioned prior art and, in particular, to provide a removable mounting device that is not bulky and allows maximum freedom of positioning the other functions on the steering wheel while maintaining ease of mounting the airbag, sufficient retention during airbag deployment, and being very simple to mount.

To this end, a first aspect of the invention relates to a device for removably mounting an airbag module on a steering wheel, the mounting device comprises at least one hook connected to one of the airbag module or the steering wheel, at least one hook cooperating with at least one insertion element located on the other of the airbag module or the steering wheel and a retaining portion of a resilient ring to form a holding element of at least one hook on the other of the airbag module or the steering wheel in a zone of interaction with the at least one hook, a mounting portion of the resilient ring forming a mounting rotation axis of the resilient ring to ensure the rotation of the resilient ring relative to the other of the airbag module or the steering wheel, the resilient ring further comprising a locking portion on the other of the airbag module or the steering wheel, characterized in that the other of the airbag module or the steering wheel comprises a first stop which is arranged to block the movement of the locking portion of the resilient ring in a first direction perpendicular to the mounting rotation axis.

Thus, it is understood that although the mounting of the resilient ring is very simple, the locking of the ring in a first direction ensures an optimal retention of the ring on the steering wheel, for example, and thus an effective retention of the airbag module.

In other words, the disclosure relates to a device for removably mounting an airbag module to a steering wheel, the mounting device comprising:
- at least one hook attached to one of the airbag modules or the steering wheel,
- at least one insertion element located on the other of the airbag module or the steering wheel, cooperating with the hook, and
- a retaining portion of a resilient member such as a resilient ring for forming a holding element of the at least one hook and linked to the other of the airbag module or the steering wheel in a zone of interaction with the at least one hook,
- a resilient member mounting portion forming a resilient member mounting rotation axis for ensuring the rotation of the resilient member relative to the other of the airbag module or the steering wheel,
- a locking portion of the resilient member on the other of the airbag module or the steering wheel, characterized in that the other of the airbag module or the steering wheel comprises a first stop arranged to block the movement of the locking portion of the resilient member in a first direction perpendicular to the mounting rotation axis.

In other words, the removable mounting device comprises the resilient member, that is the resilient ring.

According to another embodiment, the first stop may be arranged to be deformed, folded, screwed, snapped, or flared to retain the locking portion, after the resilient member is in place.

According to another embodiment, the first stop may be arranged opposite the zone of interaction on the other side of the hook.

According to another embodiment, the retaining portion may be comprised or merged into the mounting portion.

According to another embodiment, the other of the airbag module or the steering wheel may comprise a second stop arranged to block movement of the ring in a second direction perpendicular to the first direction and perpendicular to the mounting rotation axis.

Thus, it is understood that this second stop further improves the optimal holding of the ring on the steering wheel. This second stop makes it possible to locate the bending point of the ring when the airbag module is dismantled. When the module is disassembled, the part of the ring comprising the retaining portion and extending to the second stop may deform while the remainder of the ring is blocked or nearly blocked. This optimises the deformation of the ring.

According to another embodiment, the second stop may be arranged between the first stop and the retaining portion.

Thus, the part of the ring retained by the first stop is not deformed or only slightly deformed, which reduces the risk of the ring disengaging from the first stop.

According to another embodiment, the other of the airbag module or the steering wheel may comprise a third stop arranged to block movement of the ring in a third direction perpendicular to the first direction and parallel to the mounting rotation axis.

The third stop allows the part of the ring that is not or only slightly deformed to be held in place better when the airbag module is removed.

According to another embodiment, the first stop can be arranged between the second and third stops.

According to another embodiment, the other of the airbag module or the steering wheel may comprise an element for guiding the rotation of the resilient ring relative to either the airbag module or the steering wheel.

This avoids having to repeat the process several times to position the ring.

In another embodiment, the ring may form an open loop surrounding the hook.

According to another embodiment, the other of the airbag module or the steering wheel may comprise a fourth stop arranged to block movement of the ring in a second direction perpendicular to the first direction and perpendicular to the mounting rotation axis, the fourth stop also forming an element for guiding a tool to dismantle the resilient ring.

The fourth stop can be used as a guide for the dismantling tool because there is a gap between the third and fourth stops.

According to another embodiment, the resilient member (the resilient ring) comprises a deformation portion with a central radiused part surrounded by two reversal points (that is radii of curvature on both sides of the resilient member (the resilient ring), to form two successive reversals of curvature), so as to form a protrusion. This implementation provides increased elastic deformation, so that a force required to move a locking portion away from the mounting portion is lower, thus avoiding unnecessary effort from an operator during a disassembly or assembly operation.

Other characteristics and advantages of the present invention will become more apparent upon reading the detailed description of several embodiments of the invention, which are provided by way of example but in no manner limited thereto, and illustrated by the attached drawings, in which.

Figure 1:
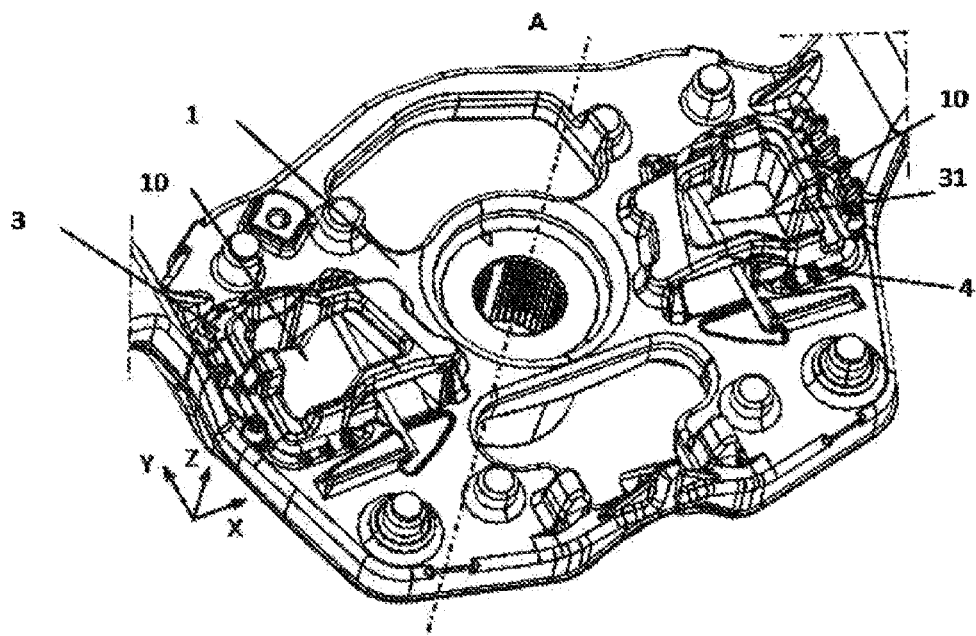
FIG. 1 shows a perspective view of a part of a steering wheel equipped with the removable mounting device according to the invention.

A first implementation of a removable mounting device according to the invention will now be described with reference to FIGS. 1 to 3.

Hereafter, the axis of rotation A of the steering wheel 1 will be taken to mean the axis around which the rotation of the steering wheel causes the wheels of the vehicle to be steered by means of a mechanical, electrical and/or hydraulic transmission mechanism (not shown).

In a known manner, an airbag module (not shown) is mounted on the steering wheel and more particularly on the steering wheel 1 frame by clipping. For this purpose, the steering wheel 1 frame comprises a plurality of openings or holes 10 through which hooks of the airbag module are inserted. The airbag module is clipped to the steering wheel 1 by means of a resilient ring 3 which interacts with each hook in a zone of interaction at the opening 10. In other words, a single resilient ring 3 is used to hold a single hook of the airbag module.

According to the shown embodiment, the resilient ring 3 is open and generally rectangular in shape. The open nature of the resilient ring 3 allows easy assembly and disassembly of the resilient ring 3. Each side of the rectangle forms a portion of the resilient ring 10.

Similarly, during assembly, each resilient ring 3 is located at the periphery of the opening so that it surrounds the hook over at least 70% of its circumference.

Each resilient ring 3 comprises a retaining portion 31 which extends through the corresponding opening 10 of the steering wheel 1 frame. The steering wheel 1 frame comprises a locking member 4 of the retaining portion 31 so that when the airbag module is mounted on the steering wheel 1 frame, the retaining portion 31 of the resilient ring 3 is engaged in the hooks of the airbag module and blocked by the locking members 4 of the steering wheel 1 frame. Thus, it is no longer possible to remove the hooks without disengaging the retaining portion 31 of the resilient ring 3. This assembly ensures that the airbag module is held in place on the steering wheel during airbag deployment, among other things.

The locking element 4 may comprise one or more bridges, typically two, forming an arch under which the retaining portion 31 is inserted during mounting. The bridge 4 is formed from the steering wheel 1 frame. Thus, in the clipped position, the retaining portion 31 is held between the steering wheel 1 frame and the bridge 4. The bridge 4 may be replaced by at least one lug, a first end of which is integral with or comes from the steering wheel 1 frame and the second free end of which overhangs the retaining portion 31 so that the movement of the retaining portion 31 is blocked or at least limited by the lug in the direction of the removal of the retaining portion 31 from the steering wheel frame.

Each ring 3 is mounted on the steering wheel 1 frame by means of a resilient ring 3 mounting portion. In the shown embodiment, the mounting portion is merged with the retaining portion 31. However, a portion separate from the retaining portion 31 may form the mounting portion of the resilient ring 3.

According to the invention, the mounting portion 31 of the resilient ring 3 forms a mounting rotation axis Y of the resilient ring 3 with respect to the steering wheel 1 frame, when mounted on the steering wheel 1 frame. In other words, when mounting the resilient ring 3 on the steering wheel 1 frame, the mounting portion 31 is inserted or placed on the steering wheel 1 frame, for example under the bridge 4 or the lug(s), and then the resilient ring 3 is rotated R along the axis formed by the mounting portion 31 to place or clip the resilient ring 3 onto the steering wheel 1 frame. In this position, the resilient ring 3 is, for example, substantially parallel to the plane of the steering wheel 1 frame.

In order to secure the ring 3 onto the steering wheel 1 frame after mounting, the resilient ring 3 comprises a locking portion 32 and the steering wheel 1 frame comprises a first locking stop 12. The first locking stop 12 of the steering wheel 1 frame is arranged to block the movement of the resilient ring 3 in a first direction Z perpendicular to the mounting rotation axis Y.

By way of example, the locking stop 12 is positioned at the periphery of the opening 10 opposite the mounting portion 31 with respect to the hook. In this position, the locking stop 12 provides optimum blocking since it is remote from the mounting rotation axis Y.

The locking stop 12 of the steering wheel 1 frame comprises, for example, a lug or a tooth-shaped protrusion. The stop 12 may comprise a ramp 120 to facilitate the placement of the locking portion 32 of the resilient ring 3 onto the steering wheel 1 frame. The stop 12 also comprises a shoulder 121. The shoulder 121 forms the stop that blocks the locking portion 32 in the first Z direction. According to the shown embodiment, the stop 12 is positioned at the periphery of the opening 10 on a side of the opening 10 opposite the mounting portion 31 corresponding in the example to the retaining portion 31. This makes it possible for the zone of interaction between the hook of the airbag module and the retaining portion 31 of the locking stop 12 to be moved further away, thus limiting the force required to clip the airbag module onto the steering wheel 1 frame.

By way of example, the locking element 4 of the retaining portion 31 described above locks the resilient ring 3 in the first direction Z.

According to the shown embodiment, the second direction Z is parallel to the axis of rotation A of the steering wheel.

The steering wheel 1 frame may comprise a guide element 15 for the rotation R of the resilient ring 3. This guide element 15 comprises, for example, a ramp 15 projecting from the steering wheel 1 frame and formed at the periphery of the hole 10, for example, between the locking stop 12 and the mounting portion 31. This ramp 15 is arranged in the continuity of the bridge 4 which, in addition to retaining the resilient ring 3 in the direction A, allows the resilient ring 3 to be easily positioned in the direction Y since, during insertion, it is sufficient to translate the mounting portion 31 under the bridge 4 until the resilient ring 3 abuts in the direction Y on that same bridge 4. Once in this position, all that remains to be done is to rotate the resilient ring 3 around the mounting portion while resting on the ramp 15.

The steering wheel 1 frame may comprise a second stop 11 for blocking the movement of the resilient ring 3 along a second direction X perpendicular to the rotation axis Y and perpendicular to the first direction Z. The second stop 11 comprises, for example, a first stud 11 formed on the steering wheel frame in the vicinity of the locking portion 32 and opposite the open part of the resilient ring 10. This particular positioning makes it possible to cause the resilient ring 10 to bend in the vicinity of the second stop 11, which reduces or even eliminates the risk of the resilient ring 10 disengaging during disassembly. Similarly, the steering wheel 1 frame may comprise, on the periphery of the opening 10 in the vicinity of the locking stop 12 and typically between the locking stop 12 and the second stop 11, a flange 16 against which the locking portion 32 bears. This flange 16 prevents the displacement or deformation of the portions of the resilient ring 3 downstream of the second stop 11, the retaining portion 31 being upstream of the second stop 11.

Furthermore, the steering wheel 1 frame may comprise a third stop 17 for blocking the movement of the resilient ring 3 in the direction of the rotation axis Y. The third stop comprises, for example, a flange 17 formed on the periphery of the opening 10 opposite the ramp 15 for guiding the resilient ring 3 in rotation. In other words, this flange 17 is also located on the same side of the opening 10 as the third stop 17. This third stop 17 allows the resilient ring 3 to be held in place more securely when the airbag module is disassembled. During disassembly, the part of the ring 3 upstream of the second stop 11, the part comprising the retaining portion 31, is free to deform. Conversely, the part of the ring 3 downstream of the second stop 11, being the part comprising the locking portion 32, is held securely by the flange 16 and the third stop 17.

Likewise, the steering wheel 1 frame may comprise a fourth stop 13 for blocking the movement of the resilient ring 3 along the second direction X perpendicular to the rotation axis Y and perpendicular to the first direction Z. The fourth stop 13 comprises, for example, a second stud 13 formed on the steering wheel 1 frame in the vicinity of a free end of the resilient ring 3 corresponding to the end of the retaining portion 31.

Disassembly of the resilient ring 3 is accomplished by pushing the free end of the retaining portion 31 outwardly from the periphery of the opening 10. This push tends to move the retaining portion 31 away from the opening 10 and thus releases the corresponding hook.

In order to ensure the optimum position of a dismantling tool, to facilitate guidance and limit the efforts required for dismantling, the fourth stop 13 forms, for example, a guide element for the tool to dismantle the resilient ring 3. Indeed, the fourth stop 13 is already positioned at the end of the retaining portion 31. The shape of the flange constituting the third stop 17 is then elongated in a direction substantially perpendicular to the retaining portion 31. Similarly, the flange 17, spaced away from the fourth stop 13 and forming the third stop 17 may form a guide element for the dismantling tool. When the dismantling tool is inserted between the fourth stop 13 and the third stop 17, it is guided by the fourth stop 13 and the flange 17 to the free end of the retaining portion 31.

Given the presence of the various stops blocking the displacement of the resilient ring 3 in three mutually perpendicular directions X, Y, Z, during disassembly, only the portion of the resilient ring up to the second stop 11 will bend without causing disengagement of the resilient ring 3.

It will be understood that different modifications and/or improvements which are obvious for the person skilled in the art may be made to the different embodiments of the invention described in this present description without departing from the scope of the invention.

Thus, according to the shown embodiment, all the resilient rings 3 are mounted on the steering wheel 1 frame; however, embodiments in which the resilient ring 3 is mounted on or integral with the steering wheel 1 frame and/or the airbag module can be envisaged. Obviously, if the resilient ring 3 is mounted on or integral with the airbag module, the hooks are mounted on or integral with the steering wheel 1 frame.

Similarly, according to another embodiment not shown, the steering wheel frame comprises hooks. According to this embodiment, the airbag module comprises insertion means for receiving the steering wheel hooks. These insertion means may take the form of openings as on the steering wheel frame or simple notches or one or more holes, openings, grooves or recesses. The airbag module in such a case also comprises the individual stops. As with the variants described above, the resilient ring interacts with the hooks to hold the airbag module to the steering wheel.

Figure 2:
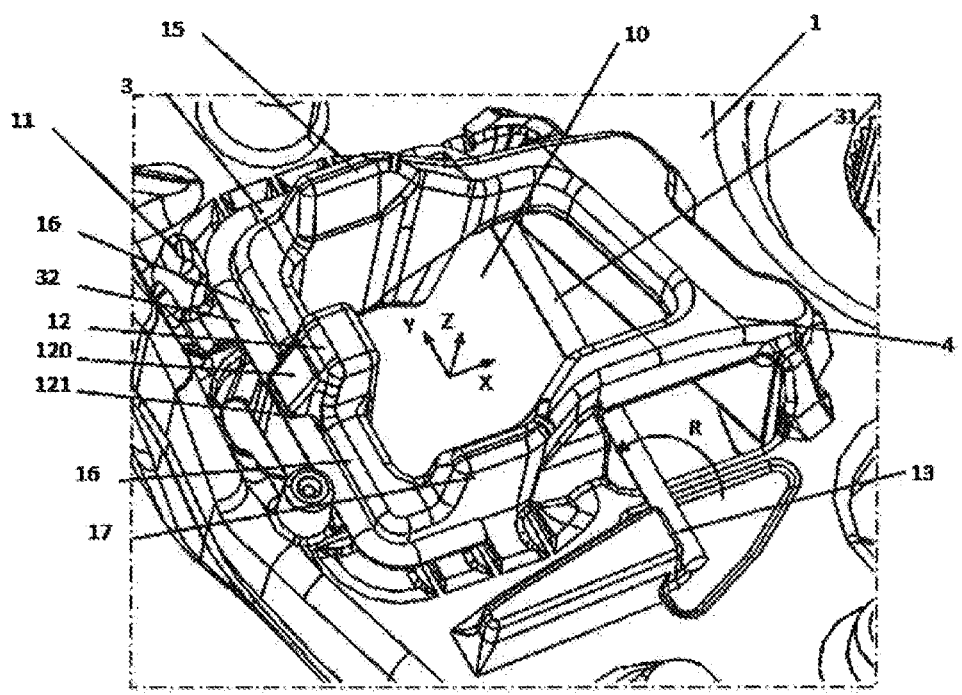
FIG. 2 shows a perspective view of the removable mounting device according to the invention.
Figure 3:
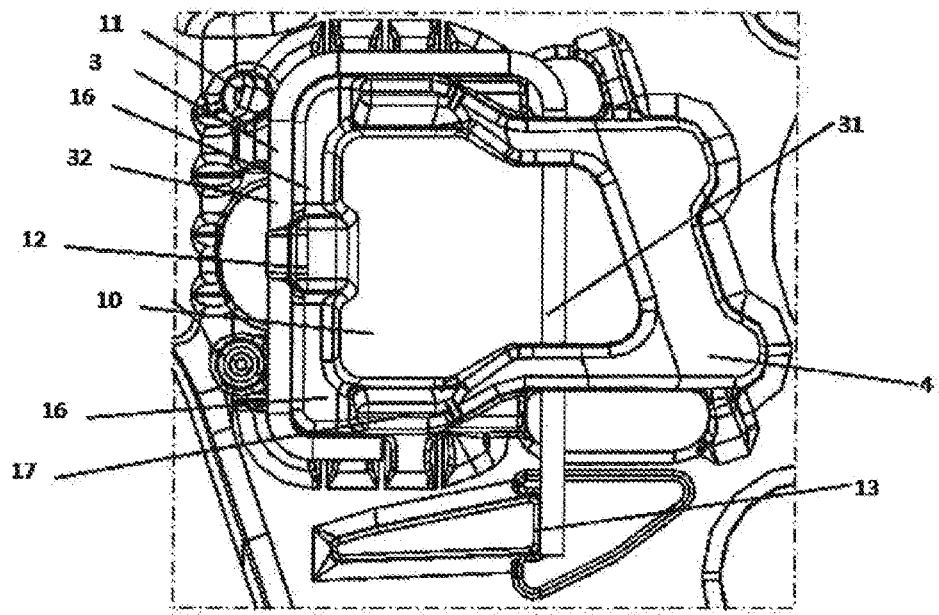
FIG. 3 shows a top view of the removable mounting device according to the invention.
Figure 4:
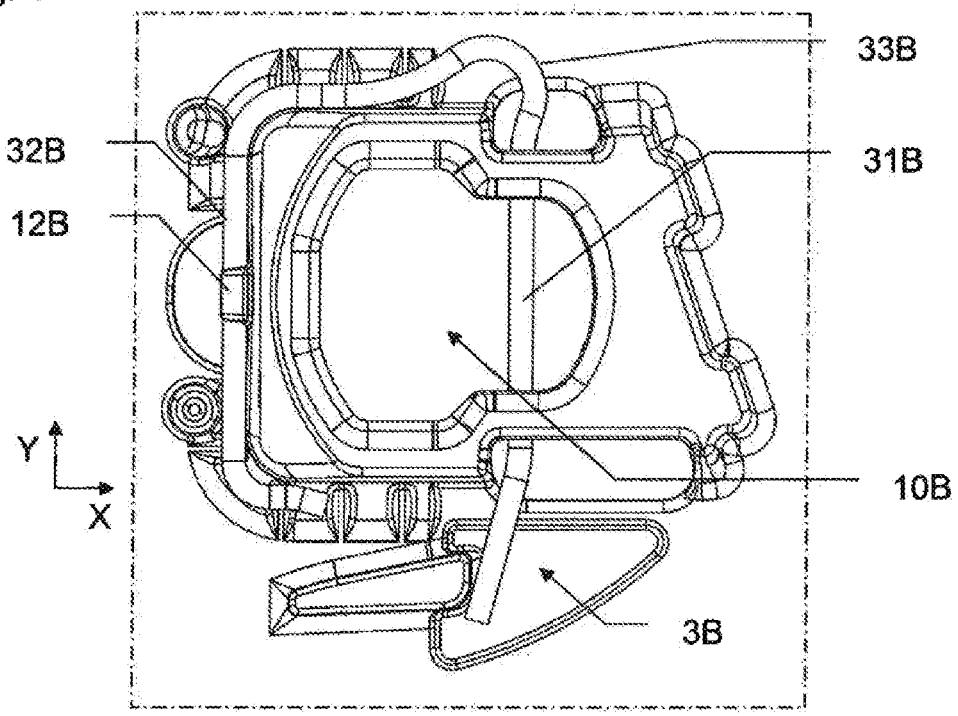
FIG. 4 shows a top view of an alternative of the removable mounting device of FIG. 3.

FIG. 4 shows an alternative embodiment of FIGS. 1 to 3, wherein a resilient ring 3B is provided with a mounting portion 31B which forms a retaining portion 31B facing the opening 10B as before, and an axis or shaft portion to rotate the resilient ring for pivoting about the Y direction.

However, the resilient ring 3B comprises a deformation portion 33B with a central radiused portion surrounded by two cusps (that is radii of curvature on both sides of the resilient ring 3B, to form two successive reversals of curvature), to form a protrusion that provides an increased elastic deformation, so that the force required to move a locking portion 32B away from the mounting portion 31B is lower, thereby sparing an operator unnecessary effort when disassembling the airbag module from the steering wheel.

In the same manner as the embodiment of FIGS. 1 to 3, the locking portion 32B engages under a locking stop 12B of the frame. The other, slightly bent end of the ring is in abutment in the X direction with a projection of the frame.

Figure 5:
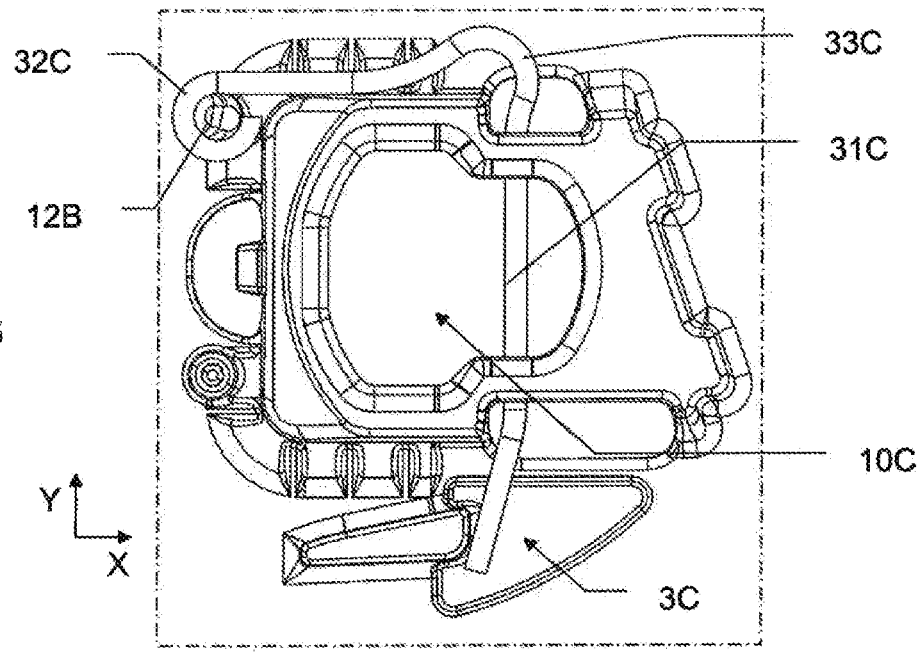
FIG. 5 shows a top view of another alternative of the removable mounting device of FIG. 3.

FIG. 5 shows another alternative embodiment of FIGS. 1 to 3, wherein a resilient ring 3C is provided with a mounting portion 31C which forms a retaining portion 31C facing the opening 10C as before, and an axis or shaft portion to rotate the resilient ring 3C for pivoting about the Y direction.

As in FIG. 4, the resilient ring 3C comprises a deformation portion 33C with a central radiused portion surrounded by two cusps (that is radii of curvature on both sides of the resilient ring 3C, to form two successive reversals of curvature), to form a protrusion that provides an increased elastic deformation, so that the force required to move a locking portion 32C away from the mounting portion 31C is lower, thereby sparing an operator unnecessary effort when disassembling the airbag module from the steering wheel.

Furthermore, compared to the embodiment of FIGS. 1 to 3, the locking portion 32C is here a ring that engages with a stud-shaped locking stop 12C of the frame, which may be deformed (crushed, flared, snap-died) before or after placement of the resilient ring 3C in the position shown. Alternatively, a screw with a screw-in washer can be used after the resilient ring 3C has been fitted in the position shown. The other, slightly bent end of the ring is in abutment in the X direction with a projection of the frame.

Figure 6:
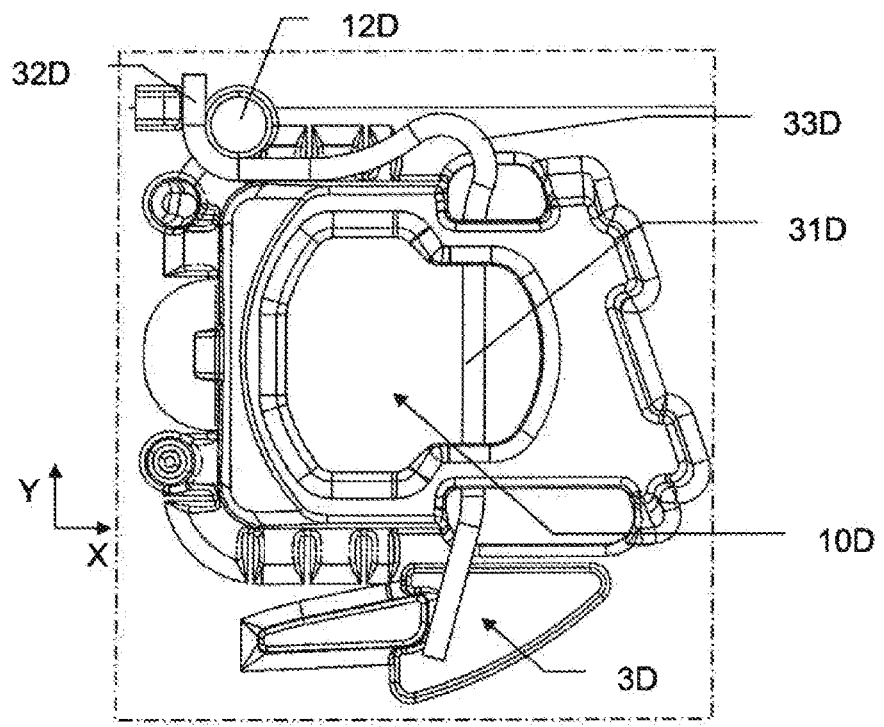
FIG. 6 shows a top view of another alternative of the removable mounting device of FIG. 3.

FIG. 6 shows another alternative embodiment of FIGS. 1 to 3, wherein a resilient ring 3D is provided with a mounting portion 31D which forms a retaining portion 31D facing the opening 10D as before, and an axis or shaft portion to rotate the resilient ring 3D for pivoting about the Y direction.

As in FIG. 4, the resilient ring 3D comprises a deformation portion 33D with a central radiused portion surrounded by two cusps (that is radii of curvature on both sides of the resilient ring 3D, to form two successive reversals of curvature), to form a protrusion that provides an increased elastic deformation, so that the force required to move a locking portion 32D away from the mounting portion 31D is lower, thereby sparing an operator unnecessary effort when disassembling the airbag module from the steering wheel.

Furthermore, compared to the embodiment of FIGS. 1 to 3, the locking portion 32D is here an arc portion that engages with a stud-shaped locking stop 12D of the frame, which may be deformed (crushed, flared, snap-died) before or after placement of the resilient ring 3D in the position shown. Alternatively, a screw with a screw-in washer can be used after the ring 3D has been fitted in the position shown. The other, slightly bent end of the resilient ring is in abutment in the X direction with a projection of the frame.

Figure 7:
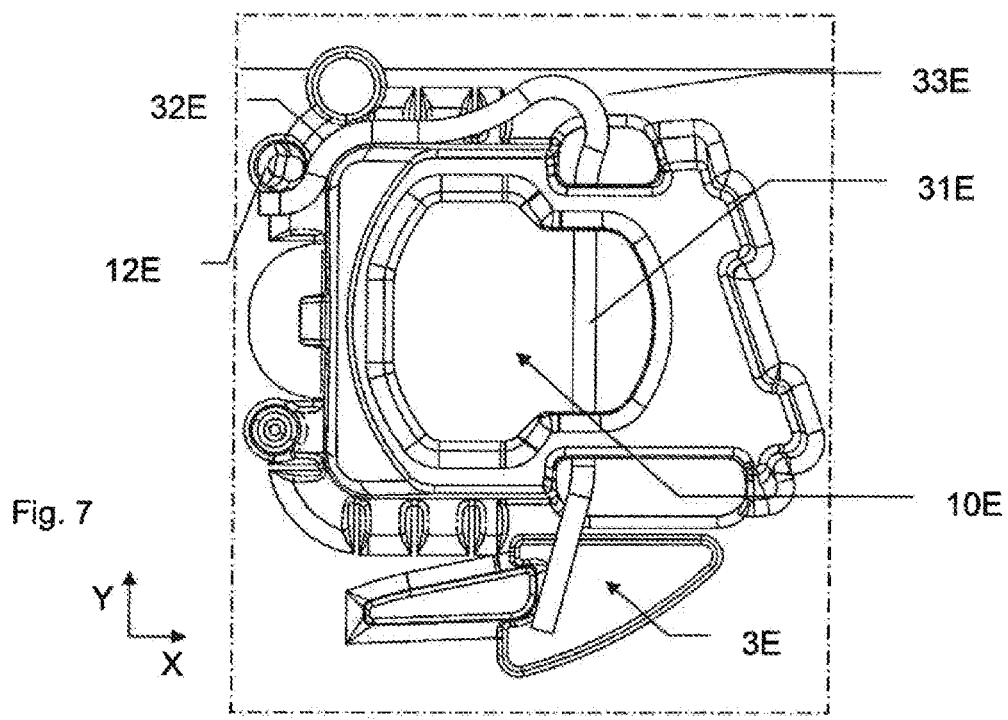
FIG. 7 shows a top view of another alternative of the removable mounting device of FIG. 3.

FIG. 7 shows another alternative embodiment of FIGS. 1 to 3, wherein a resilient ring 3E is provided with a mounting portion 31E which forms a retaining portion 31E facing the opening 10E as before, and an axis or shaft portion to rotate the resilient ring 3E for pivoting about the Y direction.

As in FIG. 4, the resilient ring 3E comprises a deformation portion 33E with a central radiused portion surrounded by two cusps (that is radii of curvature on both sides of the resilient ring 3E, to form two successive reversals of curvature), to form a protrusion that provides an increased elastic deformation, so that the force required to move a locking portion 32E away from the mounting portion 31E is lower, thereby sparing an operator unnecessary effort when disassembling the airbag module from the steering wheel.

Furthermore, compared to the embodiment of FIGS. 1 to 3, the locking portion 32E is here a corrugated portion with two reversals of curvature, that engages with a stud-shaped locking stop 12E of the frame, which may be deformed (crushed, flared, snap-died) before or after placement of the resilient ring 3E in the position shown. Alternatively, a screw with a screw-in washer can be used after the ring 3E has been fitted in the position shown. The other, slightly bent end of the ring is in abutment in the X direction with a projection of the frame.

Figure 8:
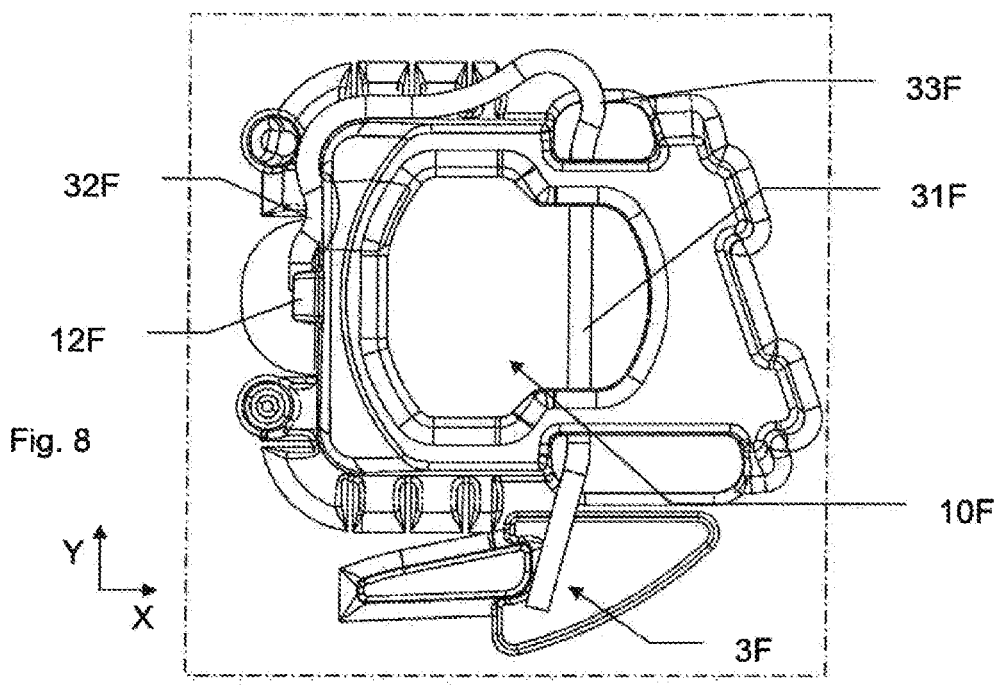
FIG. 8 shows a top view of another alternative of the removable mounting device of FIG. 3.

FIG. 8 shows another alternative embodiment of FIGS. 1 to 3, wherein a resilient ring 3F is provided with a mounting portion 31F which forms a retaining portion 31F facing the opening 10F as before, and an axis or shaft portion to rotate the resilient ring 3F for pivoting about the Y direction.

As in FIG. 4, the resilient ring 3F comprises a deformation portion 33F with a central radiused portion surrounded by two cusps (that is radii of curvature on both sides of the resilient ring 3F, to form two successive reversals of curvature), to form a protrusion that provides an increased elastic deformation, so that the force required to move a locking portion 32F away from the mounting portion 31F is lower, thereby sparing an operator unnecessary effort when disassembling the airbag module from the steering wheel.

Furthermore, compared to the embodiment of FIGS. 1 to 3, the locking portion 32F is here a corrugated portion with two reversals of curvature, which engages under a pin-shaped locking stop 12F of the frame, and also under a bridge of the frame, just above the lug 12F of FIG. 8. The other, slightly bent end of the resilient ring is in abutment in the X direction with a projection of the frame.

Figure 9:
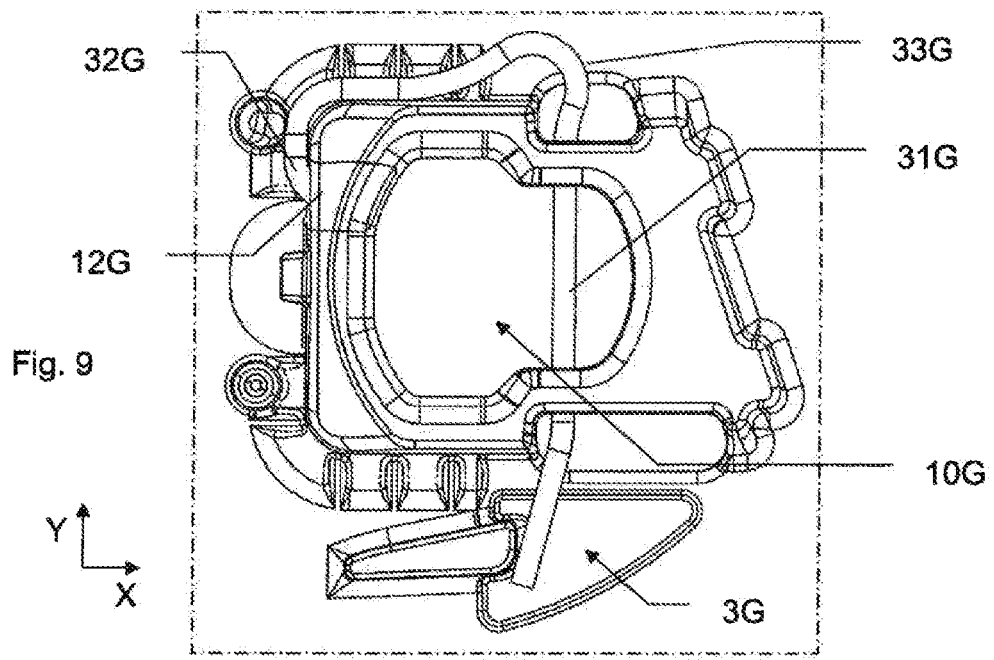
FIG. 9 shows a top view of another alternative of the removable mounting device of FIG. 3.

FIG. 9 shows another alternative embodiment of FIGS. 1 to 3, wherein a resilient ring 3G is provided with a mounting portion 31G which forms a retaining portion 31G facing the opening 10G as before, and an axis or shaft portion to rotate the resilient ring 3G for pivoting about the Y direction.

As in FIG. 4, the resilient ring 3G comprises a deformation portion 33G with a central radiused portion surrounded by two cusps (that is radii of curvature on both sides of the resilient ring 3G, to form two successive reversals of curvature), to form a protrusion that provides an increased elastic deformation, so that the force required to move a locking portion 32G away from the mounting portion 31G is lower, thereby sparing an operator unnecessary effort when disassembling the airbag module from the steering wheel.

Furthermore, in comparison to the embodiment of FIGS. 1 to 3, the locking portion 32F is here a curved portion that engages under a locking stop 12G of the frame in the form of a bridge of the frame. The other, slightly bent end of the ring is in abutment in the X direction with a projection of the frame.

Figure 10:
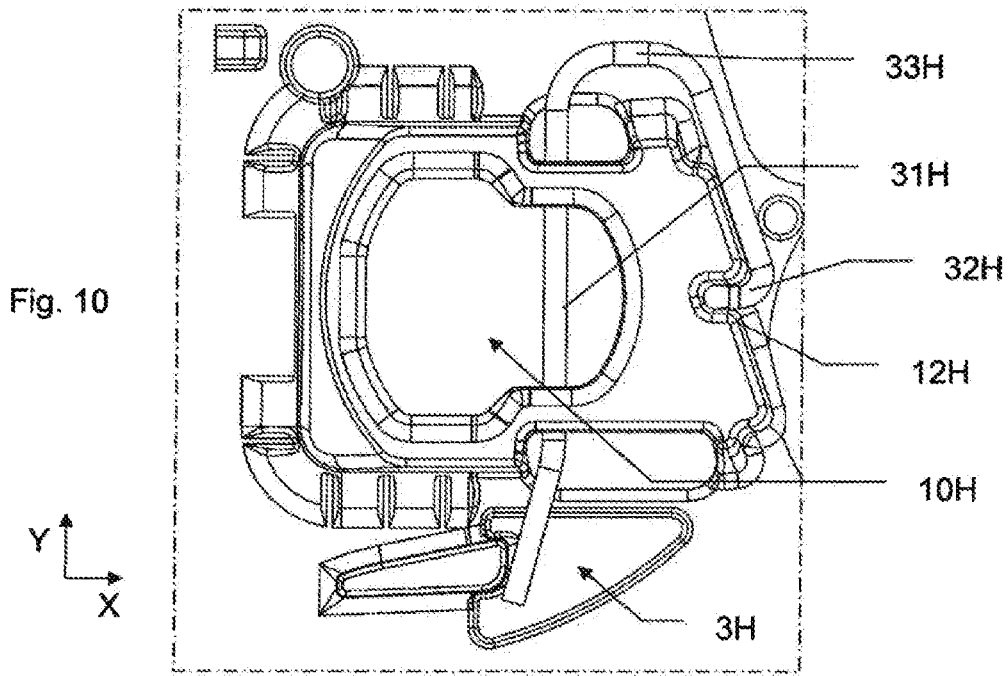
FIG. 10 shows a top view of another alternative of the removable mounting device of FIG. 3.

FIG. 10 shows another alternative embodiment of FIGS. 1 to 3, wherein a resilient ring 3H is provided with a mounting portion 31H which forms a retaining portion 31H facing the opening 10H as before, and an axis or shaft portion to rotate the resilient ring 3H for pivoting about the Y direction.

Furthermore, compared to the embodiment of FIGS. 1 to 3, the locking portion 32H, connected by the head 33H of the resilient ring 3H to the mounting portion 31H, is here a curved portion which engages in a slot forming a locking stop 12H of the frame, which can be deformed; hammered or closed again after the resilient ring 3H has been placed in the position of FIG. 10. The other, slightly bent end of the ring is in abutment in the X direction with a projection of the frame.

Figure 11:
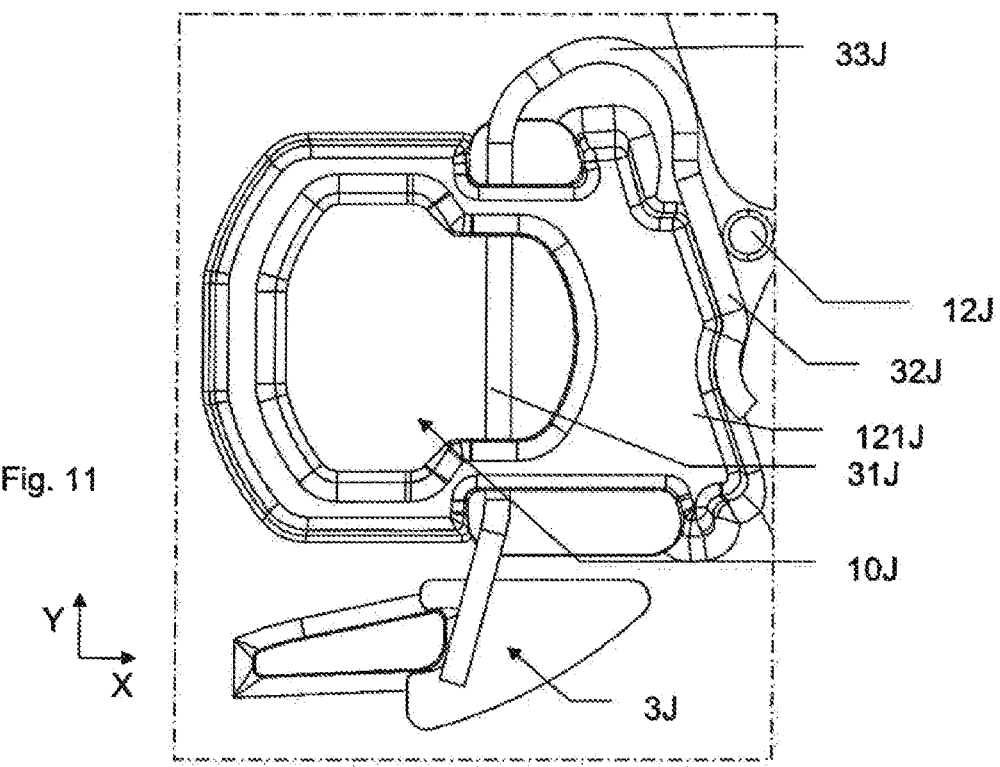
FIG. 11 shows a top view of another alternative of the removable mounting device of FIG. 3.

FIG. 11 shows another alternative embodiment of FIGS. 1 to 3, wherein a resilient ring 3J is provided with a mounting portion 31J which forms a retaining portion 31J facing the opening 10J as before, and an axis or shaft portion to rotate the resilient ring 3J for pivoting about the Y direction.

As in FIG. 4, the resilient ring 3J comprises a deformation portion 33J with a central radiused portion surrounded by two cusps (that is radii of curvature on both sides of the resilient ring 3J, to form two successive reversals of curvature), to form a protrusion that provides an increased elastic deformation, so that the force required to move a locking portion 32J away from the mounting portion 31J is lower, thereby sparing an operator unnecessary effort when disassembling the airbag module from the steering wheel.

Furthermore, in comparison to the embodiment of FIGS. 1 to 3, the locking portion 32J is here a curved portion that engages under a locking stop 12J of the frame in the form of a stud that can be deformed or folded down. Alternatively, it may be contemplated that the locking portion 32J engages a lateral groove formed on a sidewall of a boss 121J of the frame. The other, slightly bent end of the resilient ring is in abutment in the X direction with a projection of the frame.

The invention claimed is:

1. A device for removably mounting an airbag module to a steering wheel, the mounting device comprises:
    at least one hook connected to one of the airbag module or the steering wheel, the at least one hook cooperating with at least one insertion element located on the other of the airbag module or the steering wheel and
    a retaining portion of a resilient ring to form a holding element of the at least one hook on the other of the airbag module or the steering wheel in a zone of interaction with the at least one hook,
    a mounting portion of the resilient ring forming a mounting rotation axis of the resilient ring to ensure the rotation of the resilient ring relative to the other of the airbag module or the steering wheel,
    the resilient ring further comprises a locking portion on the other of the airbag module or the steering wheel,
    wherein the other of the airbag module or the steering wheel comprises a first stop which is arranged to block the movement of the locking portion of the resilient ring in a first direction perpendicular to the mounting rotation axis.

2. The device for removably mounting an airbag module on a steering wheel according to claim 1, wherein the first stop is arranged opposite the zone of interaction on the side opposite the hook.

3. The device for removably mounting an airbag module to a steering wheel according to claim 1, wherein the retaining portion is comprised or merged into the mounting portion.

4. The device for removably mounting an airbag module on a steering wheel according to claim 1, wherein the other of the airbag module or the steering wheel comprises a second stop arranged to block the movement of the resilient ring in a second direction perpendicular to the first direction and perpendicular to the mounting rotation axis.

5. The device for removably mounting an airbag module on a steering wheel according to claim 4, wherein the second stop is arranged between the first stop and the retaining portion of the resilient ring.

6. The device for removably mounting an airbag module on a steering wheel according to claim 1, wherein the other of the airbag module or the steering wheel comprises a third stop arranged to block the movement of the resilient ring in a third direction perpendicular to the first direction and parallel to the mounting rotation axis.

7. The device for removably mounting an airbag module on a steering wheel according to claim 4, wherein the first stop is arranged between the second and third stop.

8. The device for removably mounting an airbag module on a steering wheel according to claim 7, wherein the other of the airbag module or the steering wheel comprises a guide element for guiding the rotation of the resilient ring relative to one of the airbag module or the steering wheel.

9. The device for removably mounting an airbag module on a steering wheel according to claim 1, wherein the resilient ring forms an open loop surrounding the hook.

10. The device for removably mounting an airbag module on a steering wheel according to claim 1, wherein the other of the airbag module or the steering wheel comprises a fourth stop arranged to block the movement of the resilient ring in a second direction perpendicular to the first direction and perpendicular to the mounting rotation axis, the fourth stop also forming a guide element for guiding a tool to dismantle the resilient ring.

* * * * *